Figure 6:
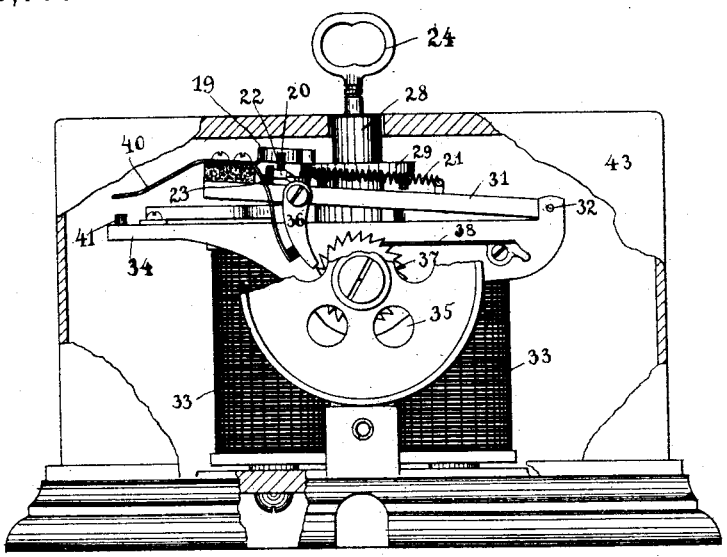

(No Model.)　　　　　　　　　　　5 Sheets—Sheet 1.
O. E. HAUSBURG.
ELECTRIC WATCHMAN'S CLOCK.
No. 538,777.　　　　　　　　Patented May 7, 1895.
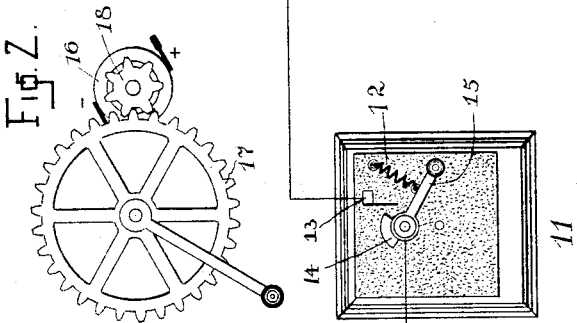
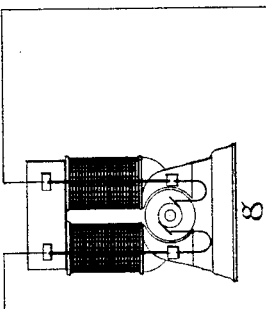
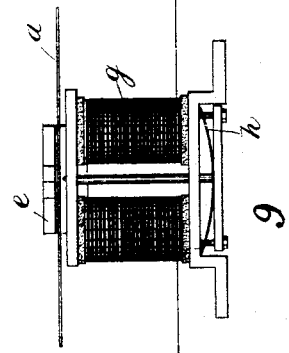
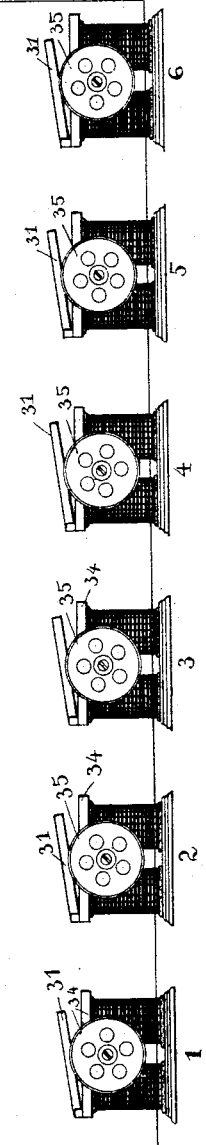
WITNESSES;　　　　　　　　INVENTOR;
T. C. A. Pfaff.　　　　　　Otto E. Hausburg.
Beatrice Williams.　　　　BY HIS ATTORNEY;
　　　　　　　　　　　　　Edward P. Thompson (No Model.) 5 Sheets—Sheet 2.
O. E. HAUSBURG.
ELECTRIC WATCHMAN'S CLOCK.
No. 538,777. Patented May 7, 1895.
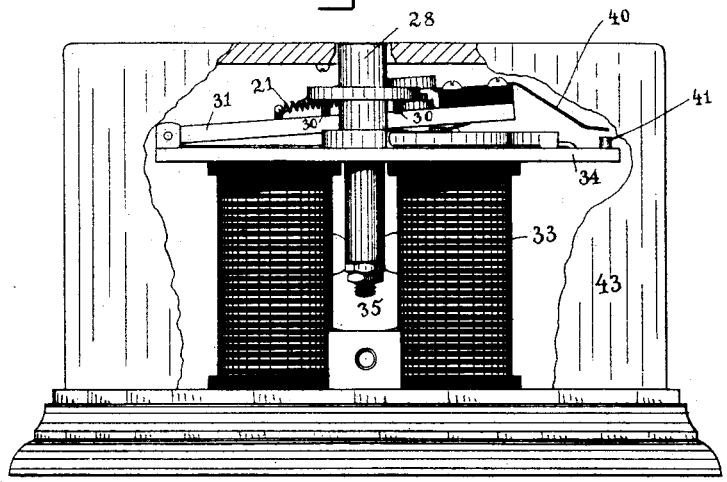
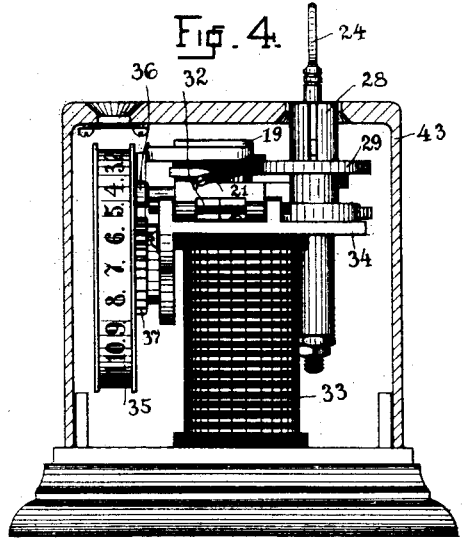
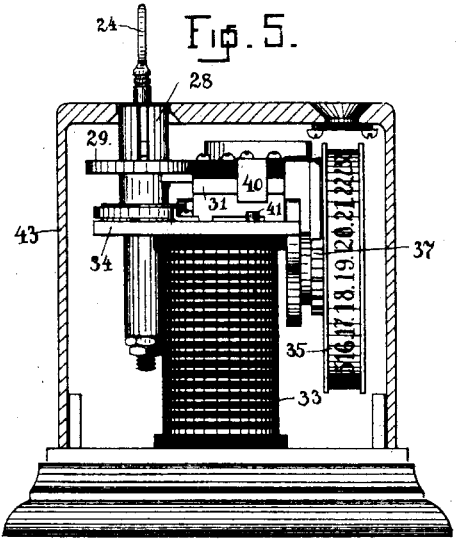
WITNESSES: INVENTOR,
T. L. A. Pfaff. Otto E. Hausburg
Beatrice Williams. BY HIS ATTORNEY,
Edward P. Thompson
THE NORRIS PETERS CO., PHOTO-LITHO., WASHINGTON, D. C.

(No Model.) 5 Sheets—Sheet 3.

O. E. HAUSBURG.
ELECTRIC WATCHMAN'S CLOCK.

No. 538,777. Patented May 7, 1895.

WITNESSES;
T. L. A. Pfaff.
Beatrice Williams

INVENTOR;
Otto E. Hausburg
BY HIS ATTORNEY;
Edward P. Thompson (No Model.) 5 Sheets—Sheet 4.
O. E. HAUSBURG.
ELECTRIC WATCHMAN'S CLOCK.
No. 538,777. Patented May 7, 1895.
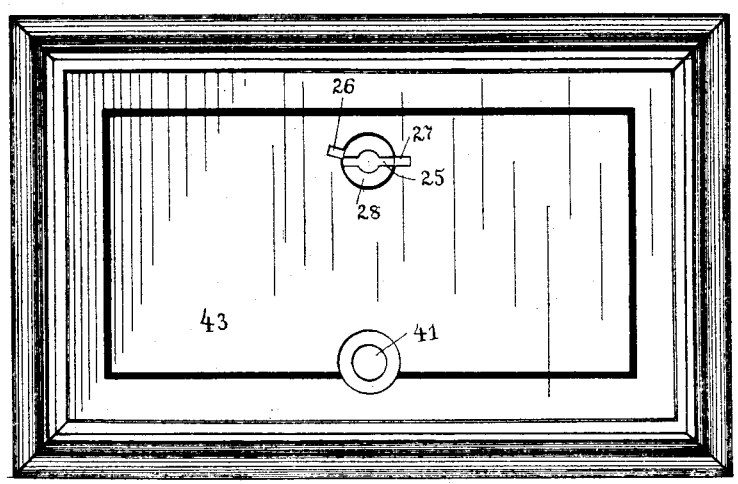
Fig. 8.
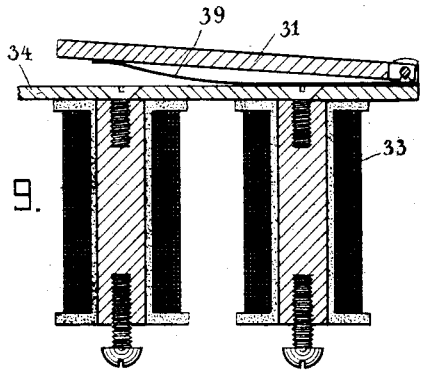
Fig. 9.
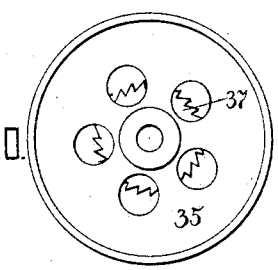
Fig. 10.
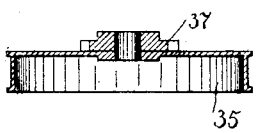
Fig. 11.
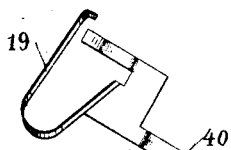
Fig. 7ª.
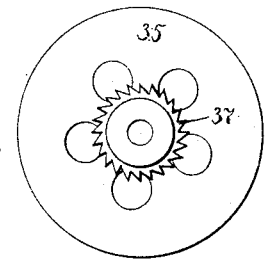
Fig. 12.
WITNESSES;
F. L. A. Pfaff.
Beatrice Williams.
INVENTOR;
Otto E. Hausburg
by
Edward P. Thompson
ATTORNEY.

(No Model.) 5 Sheets—Sheet 5.

O. E. HAUSBURG.
ELECTRIC WATCHMAN'S CLOCK.

No. 538,777. Patented May 7, 1895.

WITNESSES;
Beatrice Williams.
Nellie L. Pope.

INVENTOR,
Otto E. Hausburg
by Edward P. Thompson
ATTORNEY

UNITED STATES PATENT OFFICE.

OTTO E. HAUSBURG, OF NEW YORK, N. Y.

ELECTRIC WATCHMAN'S CLOCK.

SPECIFICATION forming part of Letters Patent No. 538,777, dated May 7, 1895.

Application filed April 17, 1894. Serial No. 507,853. (No model.)

*To all whom it may concern:*

Be it known that I, OTTO E. HAUSBURG, a subject of the German Emperor, and a resident of New York, in the county of New York and State of New York, have invented certain new and useful Improvements in Electric Watchmen's Clocks, (Case No. 4,) of which the following is a specification.

My invention relates to a system and devices intended to act as detectors over watchmen who are required to go through predetermined routes and to operate certain devices at intermediate stations to the end that these devices may send at proper times, signals to a central station, which is under the control of a higher authority.

Without at present describing all the details, I may state that my invention involves the turning of keys in devices located at the different stations, whereby these devices close an electric circuit, only when the watchman has been at every device. By this means he places all the devices, which may be called transmitters, in series with one another and with the receiver at the central station. Finally he goes to the generator or to a circuit closer and passes a current through the line. Inasmuch as the transmitters have been placed in series, a current passes over the line and operates the receiver, whereby a record is made upon the rotating dial every time that the current is sent over the line. In brief, the watchman must go to all stations and turn the keys at least once and then he finally goes to the generator and braces a lever, turns a handle or in some other way sends a current over the line. When the current is sent over the line it automatically cuts out the transmitters—that is, the circuit becomes broken at each transmitter. It becomes impossible to tamper with the transmitters, because each transmitter is a kind of recorder, and acts as a tell-tale upon the receiver, which does the same upon the transmitters.

I will now describe the accompanying drawings which disclose every detail of my invention.

Figure 7:
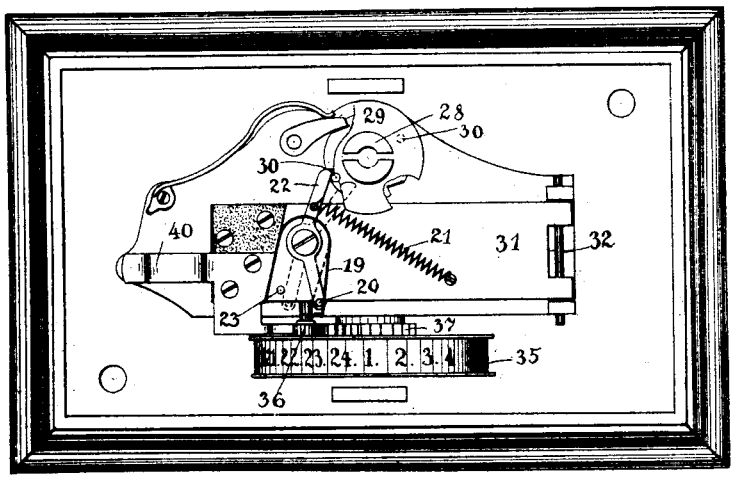
Figure 13:
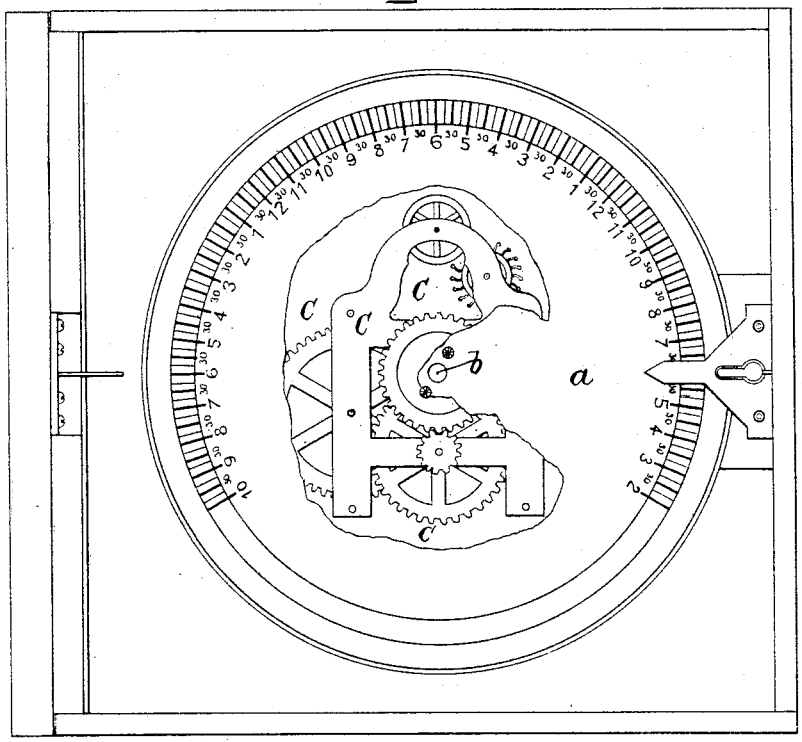
Figure 14:
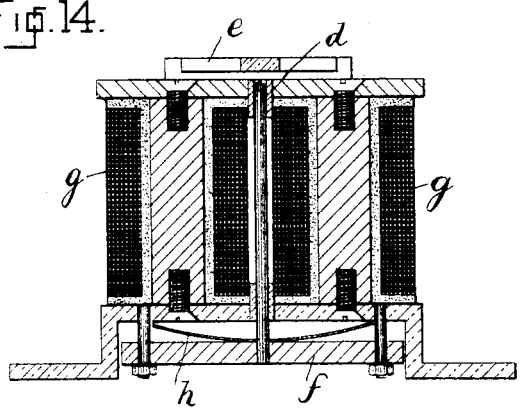
Figure 15:
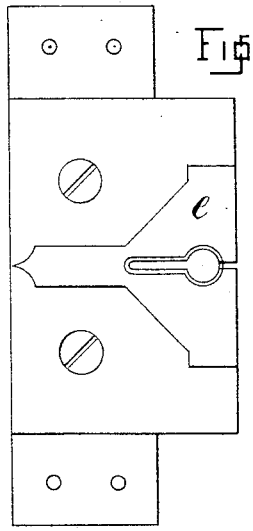

Figure 1 has for its primary object to disclose the arrangement of the respective devices. It shows the system in complete condition for operation. Fig. 2 shows a device which may be employed in connection with my invention. Fig. 3 is a side elevation of the transmitter, from which a portion of the inclosing-box is broken away, so as to show the interior. Figs. 4 and 5 are respectively opposite end views of a transmitter, in which the containing-box is shown in section. Fig. 6 is a view similar to that shown in Fig. 3, except that it is a front view, while Fig. 3 shows a rear view. Further parts of the device itself are shown broken away in Fig. 6, in order to show more details than would be shown if such parts were not broken away. Fig. 7 is a plan of the transmitter, showing the circuit-closer closed, the cover for the inclosing-box being removed. Fig. 7ª is a perspective view of the platinum terminal. Fig. 8 is a plan of the transmitter as it appears when the cover is applied to the same. It shows particularly the arrangement whereby the key must be turned to its full position before it can be removed. Figs. 9, 10, 11, 12, and 7ª show details of the transmitter. Fig. 9 is a section of the magnet and its spring armature, the section being taken in the plane of the axis of the magnet-coils. Fig. 10 is a side elevation of the recording-disk, showing the ratchet-wheel on the other side. Fig. 11 is a cross-section of the recording-wheel. Fig. 12 is a view of the opposite side of that shown in Fig. 10. Fig. 13 is a front elevation of the receiver at the central station. This does not form a part of my invention, as far as its mechanical details are concerned, for I have already obtained a patent therefor. Consequently I do not show many views of the receiver. In Fig. 13 as many details as possible are shown in one figure by breaking away parts of the devices. Fig. 14 is a sectional view of the magnet-puncturing device employed in the receiver. Fig. 15 is a plan of the devices seen in Fig. 14. It is not in section.

Referring to Fig. 1, which shows a diagram of the circuits and typical representations of the individual devices, I would state that the following are the elements shown. Inasmuch as I need more characters of reference than are contained in the alphabet, I will employ figures.

1, 2, 3, 4, 5, 6, are the transmitters located for example, upon the different floors of a building, or different portions of a factory, or at intervals along the street. They are the devices to which the watchman approaches and operates in succession at stated intervals during the night or on Sundays, or holidays or at any other time when the responsibility as to fire, damage, or theft rests upon his performing his duty. As he visits each transmitter he turns a key, as hereinafter shown, and this sets the transmitter, the principal object being the closing of the circuit, 7, coming from the generator 8. The receiver is located at 9, where the more important elements are represented in Fig. 1.

After the watchman has closd the circuit at each transmitter he proceeds to the circuit closer 11, and pushes the handle down once. The spring 12, re-sets it. During the movement of the circuit closer handle, the circuit is entirely complete throughout, because all the transmitters have been connected in circuit, and because the two generator terminals 13, and 14, have been brought in contact by pushing down the handle 15.

Instead of having the dynamo 8, and the circuit closer 11, it may be sufficient to have a magneto machine shown in Fig. 2, consisting of a dynamo whose collector is 16. When the large wheel 17, is turned, the collector, having the pinion 18, is rapidly rotated, thereby generating a current which is sent over the line. By properly proportioning the gearing the watchman may by one turn send over the line a sufficient current for the purpose, which is the operating of the receiver, and the opening of the circuit again at each transmitter.

Having given an outline of the system, it now becomes necessary to set forth the details of the devices, involved in the system. To this end I will describe the details of the transmitter.

The electric terminals in the transmitter, which are closed by turning a key are numbered 19 and 20. The terminal 19 is properly insulated by the portions shown in heavy black from the rest of the devices, while terminal 20, is simply a pin carried upon a lever which has metallic connection with the whole frame and mechanism. The terminal 19 is preferably of platinum, as also the pin 20. Retractile spring 21, is adapted to act upon the lever 22, which carries the pin 20, and which may be called the circuit closer, because by operating it, it closes the circuit by bringing the terminals 19 and 20, in contact with each other. 23, is a stop for stopping the circuit closer when it is released.

The manner in which the key 24, operates the circuit closer is thus described: The normal condition of the key-hole 25, is shown in Fig. 8 in the plainest manner. The stock of the key goes in the enlarged central portion as far as it can be pushed. It is then turned around until the projection on the key can be pulled out of the notch 26, it having entered the notch 27. In other words, the key makes a little more than one half of a revolution so as to be sure that the watchman must turn it thus far before he can take out the key for the purpose of moving on to the next transmitter. The key hole is made in a rotary cylinder 28, which projects upward from a disk 29, from which extend downward at diametrically opposite points two pins 30, which alternately close the circuit closer at the successive visits of the watchman. The watchman therefore, visits each transmitter in order and applies the key, turns it a little more than a half revolution and removes it. The circuit at each transmitter therefore, becomes closed. Now I will proceed to describe what happens and how it happens when he sends a current through the line. The circuit closer 22, before mentioned, is mounted upon an armature 31, which also carries the terminal 19. The armature is hinged by the pivot 32, and belongs to the magnet 33. The armature is pivoted to a metallic frame 34, which is screwed upon the cores of the magnet. The pins of the disk 29, are of such a length that when the armature is attracted to the full distance by the magnet 33, the circuit closer escapes from said pins, and the retractile spring 21, pulls it and opens it to its position against the stop 23, so that the transmitter is again ready for the insertion of the key 24, for closing the circuit. At the same time that the armature is attracted to the magnet, the indicating disk 35 is turned to the distance of one of the indicating numbers arranged on its periphery. This is done by a pawl 36, and ratchet 37. The former is pinned to the armature 31 and the latter is centrally attached to the rotary disk 35. Retaining pawls 38, prevent this disk from being rotated backward. The armature 31, is provided with a retractile spring 39, which keeps the armature away from the magnet.

40 is a terminal projecting from the armature and forming the same piece with the terminal 19. Below the terminal 40, is a terminal 41, lying in the path of the terminal 40 and attached to the frame. These terminals are in circuit with the magnet and are simply to insure the maintenance of the closed circuit until the armature is attracted to its full distance. By this scheme, the mechanic, in the course of construction, need not be particular about having the pins 30, of exactly the right length. The serial numbers on the disk 35, may be seen through the aperture 41, in the cover 43. In the normal condition all boxes are set to indicate unity. When the watchman has made his complete tour and pulled down the magneto handle once, the disk will turn to indicate 2, in each transmitter. On its next trip it will indicate 3, and then 4, and so on up to as many as twenty trips. It should be noticed that this disk cannot be operated by the current until the circuit has been closed at each transmitter; that is, until the watchman has operated each transmitter by his key. Even if he should destroy the cover 43, or in any way be able to turn the disk 35, to such numbers as he pleased, he would still be confronted by a difficulty in that he could not operate the central station device without current, that is, without closing the circuit at every transmitter. Again, if he should get access to the receiver at the central station and tamper with it so as to indicate falsely, it would be of no avail to him, because the transmitters would show that he had not made his trips.

It is scarcely necessary to allude to the receiving instrument more than to say that it is provided with a dial, and an electro magnetic puncturing device. I will therefore give a mere brief of the important elements in this application. In order to obtain a distinct means of referring to the receiver, I will employ the letters of the alphabet.

$a$, is a dial preferably of paper and fixed upon the continuously and uniformly rotating axle $b$, which may be rotated in such a manner by clock work $c$, behind the dial. The dial moves between the pointed pin $d$, and a perforated plate $e$, so that when the said pin is pushed up it perforates the paper. The pin is carried by an armature $f$, which belongs to the magnet $g$. It is kept away from the magnet by a spring $h$. When the armature is attracted by the magnet, as it always is when the circuit is closed, the paper is punctured, and by means of a series of numbers upon the dial, as explained in my former patent, acts of the watchman are fully recorded for a predetermined period. Of course the dial is locked behind a glass plate so that it can be seen and yet protected.

Whenever the circuit is closed as hereinbefore described, at the end of each tour of the watchman the paper becomes punctured by the attraction of the armature to the maget $g$.

I claim as my invention—

1. A watchman's time detector system consisting of the combination with a generator of electricity, of a conducting line connecting the poles of the generator, circuit closers located in circuit with said line at sub stations, an electric recorder in said circuit at a different station, and means for automatically and simultaneously opening said circuit closers.

2. A watchman's time detector system consisting of the combination of an electric recorder at a central station, electric recorders at sub stations, electric circuit closers at sub stations an electric conducting line connecting all of said devices with one another, and means located at a single independent station for operating all of the said recorders automatically and simultaneously, and for opening the said circuit closers of the said line at each of the sub stations.

3. A watchman's time detector system consisting of the combination of a generator of electricity, a main conducting line connecting the poles of the generator, electro magnetic circuit interrupters at sub stations, an electric recorder at a sub station, all in circuit with said line, and a manual circuit closer in said line for controlling the circuit of said interrupters and said recorder.

4. A watchman's time detector system consisting of the combination of a generator of electricity, a conducting line connecting the poles of the generator, electro magnetic circuit interrupters in said line at sub stations, recorders at said stations controlled mechanically by said interrupters, an electric recorder at a central station and a manual circuit closer for controlling the circuit of the said electro magnetic circuit interrupters and said recorder.

5. A transmitter for a watchman's time detector system consisting of an electro magnet, a non-magnetic plate connecting the poles thereof, an armature pivoted upon the plate within inductive relation to said magnet, a rotary disk carrying a ratchet wheel, a pawl carried by the armature and engaged with the ratchet wheel, electric terminals carried upon the armature, a pivoted lever carrying one of the terminals, rotary disk carrying pins, in whose path lies the lever normally open, and means for turning the rotary disk.

6. A watchman's time detector system consisting of the combination of a source of electrical energy, a main line conductor normally open at sub-stations, an electro magnetic recording device at a main station, and included in said circuit, and means for closing the conductor at all the said sub stations, said means consisting of electric terminals, one of which is a pivoted rotary lever, a rotary disk having pins in whose path lies said lever, and a key for turning said disk.

7. A watchman's time detector system consisting of the combination of a source of electrical energy, a main conducting line connected with the source, electro magnetic circuit interrupters normally open included at sub stations in the said line, means for closing the interrupters, indicating devices mechanically controlled by said electro magnetic interrupters, and means at a central station for recording the passage of an electric current over the said line, and a mechanical circuit controller at the central station in circuit with said electro magnetic interrupters.

8. A watchman's time detector system consisting of the combination of a generator of electrical energy, a main line conductor normally open at sub stations and in circuit with said generator, an electro magnetic recording device at a main station, and included in said circuit, electro magnetic devices at the sub stations for closing the conductor at all the said sub stations, and a circuit closer at the main station in circuit with said devices.

9. The combination with the source of an electric current, of a main line conductor passing from one pole to the other thereof, electro magnetic circuit interrupters and recorders located at stations and included in circuit with said conductor and an electro magnetic puncturing device in circuit with said conductor and located at another station.

In testimony that I claim the foregoing as my invention I have signed my name, in presence of two witnesses, this 12th day of April, 1894.

OTTO E. HAUSBURG. [L. S.]

Witnesses:
 ROBERT S. CHAPPELL,
 EDWARD P. THOMPSON.